United States Patent
Takeichi et al.

(10) Patent No.: US 9,019,304 B2
(45) Date of Patent: Apr. 28, 2015

(54) IMAGE PROCESSING APPARATUS AND CONTROL METHOD THEREOF

(75) Inventors: Shinya Takeichi, Kawasaki (JP); Waki Murakami, Tokyo (JP); Satoru Mamiya, Yokohama (JP); Jun Fujisawa, Tokyo (JP); Shuichi Okamura, Kawasaki (JP); Atsushi Date, Tokyo (JP); Takeshi Suzuki, Tachikawa (JP); Akihiro Takamura, Fuchu (JP); Toru Nomakuchi, Abiko (JP); Shigeru Sakamoto, Ichikawa (JP)

(73) Assignee: Canon Kabushiki Kaisha, Tokyo (JP)

(*) Notice: Subject to any disclaimer, the term of this patent is extended or adjusted under 35 U.S.C. 154(b) by 248 days.

(21) Appl. No.: 12/935,963

(22) PCT Filed: May 29, 2009

(86) PCT No.: PCT/JP2009/060301
§ 371 (c)(1),
(2), (4) Date: Oct. 1, 2010

(87) PCT Pub. No.: WO2009/150998
PCT Pub. Date: Dec. 17, 2009

(65) Prior Publication Data
US 2011/0025708 A1   Feb. 3, 2011

(30) Foreign Application Priority Data
Jun. 12, 2008   (JP) .................... 2008-154589

(51) Int. Cl.
G09G 5/00   (2006.01)
G09G 5/36   (2006.01)
G06T 11/00   (2006.01)
G09G 5/14   (2006.01)

(52) U.S. Cl.
CPC ................ *G09G 5/363* (2013.01); *G06T 11/00* (2013.01); *G09G 5/006* (2013.01); *G09G 5/14* (2013.01); *G09G 2340/0414* (2013.01); *G09G 2340/0421* (2013.01); *G09G 2340/0471* (2013.01); *G09G 2340/0478* (2013.01); *G09G 2340/125* (2013.01)

(58) Field of Classification Search
USPC ........................................ 345/620
See application file for complete search history.

(56) References Cited

U.S. PATENT DOCUMENTS

| | | | |
|---|---|---|---|
| 6,657,637 B1 | 12/2003 | Inagaki et al. | |
| 6,891,970 B1 | 5/2005 | Suzuki | |
| 7,271,814 B2 | 9/2007 | Anwar et al. | |
| 7,558,403 B2 | 7/2009 | Katayama et al. | |
| 2005/0017986 A1* | 1/2005 | Anwar et al. | 345/629 |
| 2009/0079763 A1 | 3/2009 | Takeichi | |

FOREIGN PATENT DOCUMENTS

| | | |
|---|---|---|
| JP | 06-274649 A | 9/1994 |
| JP | 07-072850 A | 3/1995 |

(Continued)

OTHER PUBLICATIONS

International Search Report and Written Opinion in corresponding PCT/JP2009/060301, mailed Nov. 8, 2009.

*Primary Examiner* — Phi Hoang
*Assistant Examiner* — Mohammad H Akhavannik
(74) *Attorney, Agent, or Firm* — Fitzpatrick, Cella, Harper & Scinto

(57) ABSTRACT

According to an image processing apparatus and a control method thereof of the present invention, a graphics drawing result is obtained in accordance with one or more graphics drawing commands included in drawing commands, a clipping command is generated from one or more moving image drawing commands included in the drawing commands, and clipped graphics is obtained by clipping the graphics drawing result using the clipping command. Further, moving image data processed in accordance with the one or more moving image drawing commands included in the drawing commands is generated, and the generated moving image data and the clipped graphics are composed and output.

14 Claims, 14 Drawing Sheets

FOREIGN PATENT DOCUMENTS

| | | |
|---|---|---|
| JP | 11-143441 A | 5/1999 |
| JP | 2005-031510 A | 2/2005 |
| JP | 2005-505860 A | 2/2005 |
| JP | 2005-321481 A | 11/2005 |
| JP | 2006-285788 A | 10/2006 |
| JP | 2008-071241 A | 3/2008 |
| WO | 00/07364 A1 | 2/2000 |

* cited by examiner

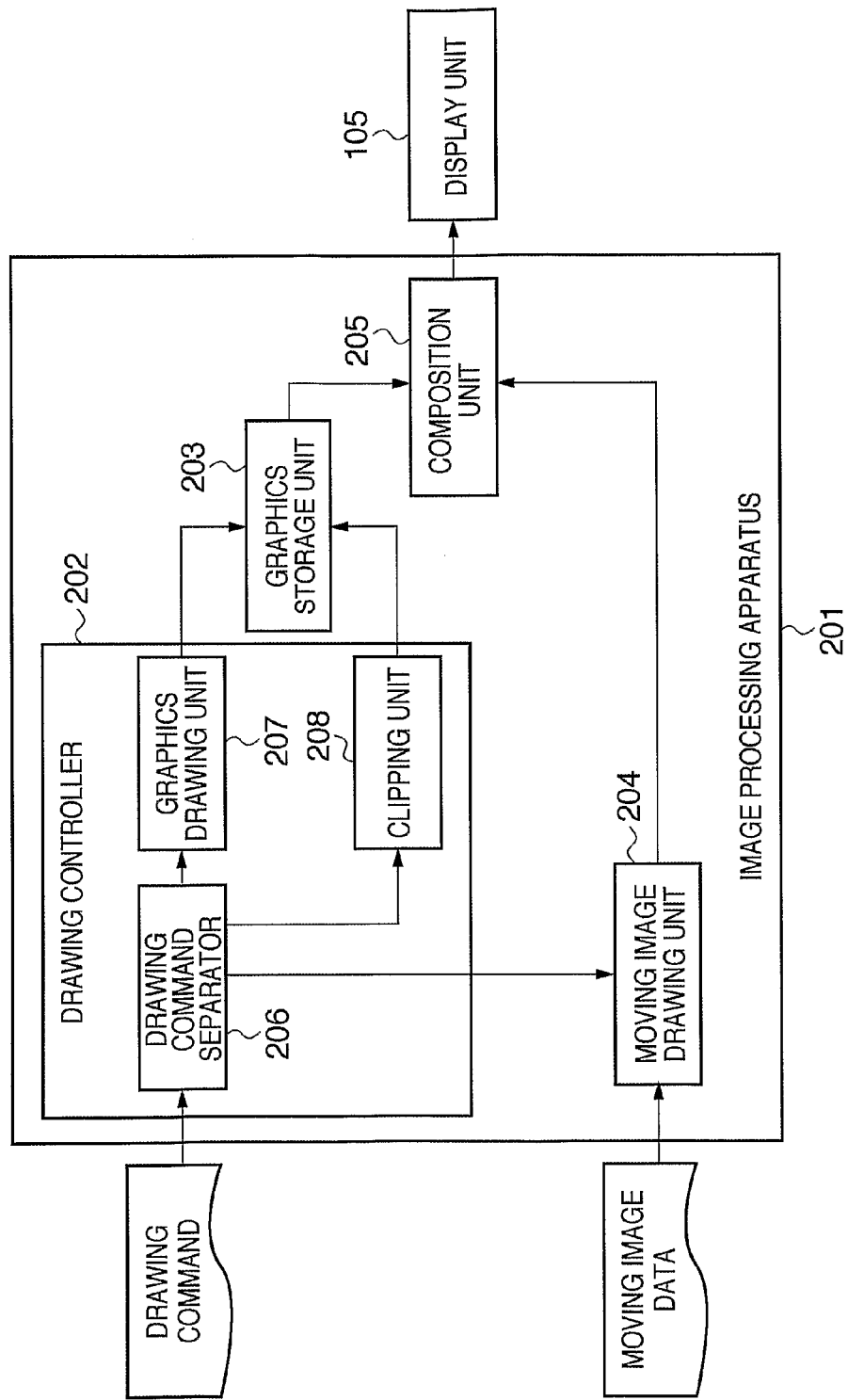

FIG. 3A

| INPUT ORDER | DRAWING COMMAND | |
|---|---|---|
| 1 | RECTANGLE DRAWING COMMAND (x1,y1,w1,h1,c1) | ~301 |
| 2 | MOVING IMAGE DRAWING COMMAND (sx2,sy2,x2,y2) | ~302 |
| 3 | RECTANGLE DRAWING COMMAND (x3,y3,w3,h3,c3) | ~303 |
| 4 | MOVING IMAGE DRAWING COMMAND (sx4,sy4,x4,y4) | ~304 |

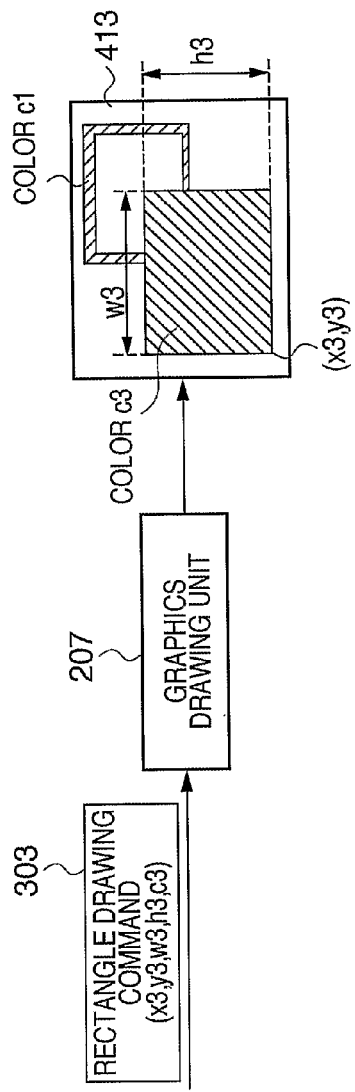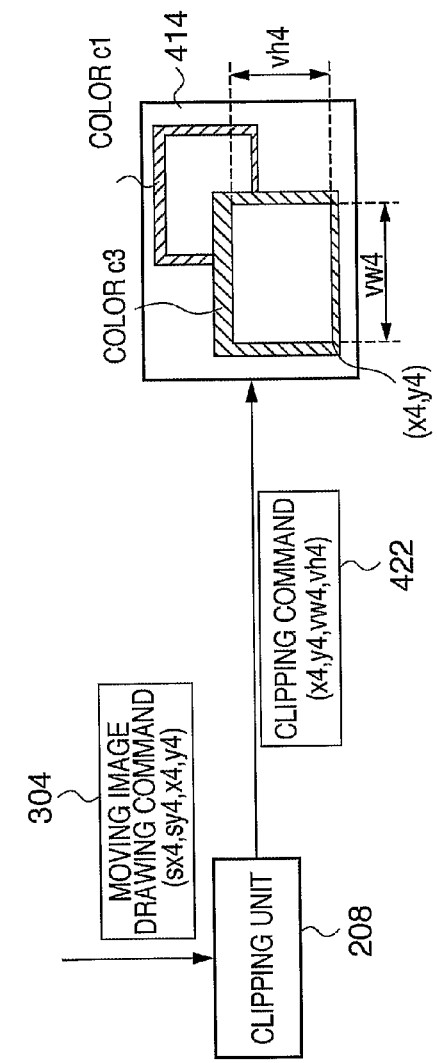
FIG. 4C
FIG. 4D

FIG. 7A

| INPUT ORDER | DRAWING COMMAND | |
|---|---|---|
| 1 | POLYGONAL DRAWING COMMAND (px[],py[],cp) | ~701 |
| 2 | MOVING IMAGE DRAWING COMMAND (sx5,sy5,x5,y5,m5) | ~702 |
| 3 | ELLIPTIC DRAWING COMMAND (cx,cy,rx,ry,ce) | ~703 |
| 4 | MOVING IMAGE DRAWING COMMAND (sx6,sy6,x6,y6,m6) | ~704 |

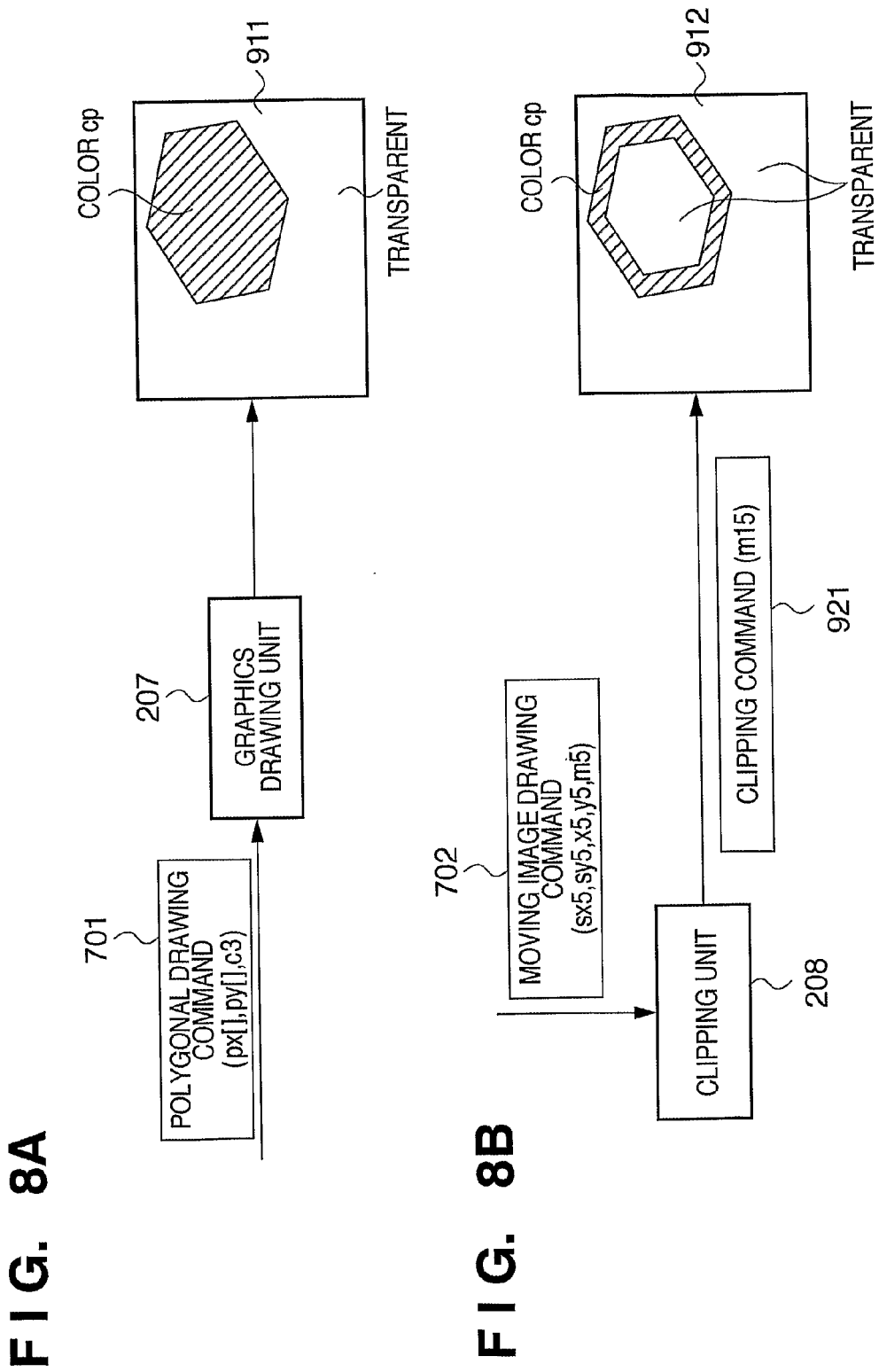

IMAGE PROCESSING APPARATUS AND CONTROL METHOD THEREOF

TECHNICAL FIELD

The present invention relates to an image processing apparatus for composing graphics and moving image data input thereto, and to a control method thereof.

BACKGROUND ART

Conventionally, an image that includes a moving image and graphics was constituted by capturing a frame image of the moving image and combining the graphics with the frame image, which is treated as a still image. However, the use application of images, the data format and the type of drawing process required differ between moving images and graphics. For example, in the case of moving images, a technique that prevents a reduction in moving image quality due to dropped frames or the like is sought. The systems for processing moving images and graphics are therefore separated, and the output results of the respective processing systems are composed and output.

Japanese Patent Laid-Open No. 07-72850, which relates to an image forming apparatus that composes and outputs a moving image and graphics, proposes a method for composing graphics data and moving image data stored in memory while switching the readout addresses in memory. Japanese Patent Laid-Open No. 2005-321481 proposes achieving high quality video by keeping a video signal processing function independent from a graphics controller, and inputting images created by the graphics controller as video signals.

However, while the respective quality of moving images and graphics can be enhanced according to the above-mentioned conventional methods since the systems for processing a moving image and graphics are separated, in the case where a moving image and graphics are displayed so as to overlap, a plurality of buffers are needed for storing the graphics drawing results in order for display to be performed correctly. The resultant increase in device cost was problematic.

DISCLOSURE OF INVENTION

An aspect of the present invention is to eliminate the above-mentioned problems with the conventional technology.

An aspect of the present invention is to provide a technique being capable of composing a moving image and a graphic by reducing a capacity of a memory that stores graphics drawing results.

According to an aspect of the present invention, there is provided an image processing apparatus for receiving drawing commands that include one or more moving image drawing commands and one or more graphics drawing commands, and performing a drawing process, comprising:

graphics drawing means for obtaining a graphics drawing result in accordance with the one or more graphics drawing commands included in the drawing commands;

clipping means for generating a clipping command based on the one or more moving image drawing commands included in the drawing commands;

storage means for storing clipped graphics obtained by clipping the graphics drawing result using the clipping command;

moving image drawing means for generating moving image data processed in accordance with the one or more moving image drawing commands included in the drawing commands; and composition means for composing the clipped graphics stored in the storage means and the moving image data generated by the moving image drawing means.

According to another aspect of the present invention, there is provided a control method of an image processing apparatus for receiving drawing commands that include one or more moving image drawing commands and one or more graphics drawing commands, and performing a drawing process, the method comprising:

a graphics drawing step of obtaining a graphics drawing result in accordance with the one or more graphics drawing commands included in the drawing commands;

a clipping step of generating a clipping command from the one or more moving image drawing commands included in the drawing commands;

a storage step of storing clipped graphics obtained by clipping the graphics drawing result using the clipping command;

a moving image drawing step of generating moving image data processed in accordance with the one or more moving image drawing commands included in the drawing commands; and a composition step of composing the clipped graphics stored in the storage step and the moving image data generated in the moving image drawing step.

Further features and aspects of the present invention will become apparent from the following description of exemplary embodiments, with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 2 is a functional block diagram illustrating functions of the image processing apparatus according to the exemplary embodiments.

FIGS. 3A to 3E depict views describing exemplary drawing commands input to the image processing apparatus according to a first embodiment of the present invention, and exemplary results from executing the drawing commands.

FIGS. 4A to 4D are schematic diagrams showing the content of graphics drawing results stored by a graphics storage unit when the drawing commands shown in FIG. 3A are executed sequentially.

FIGS. 7A to 7B depict views describing an exemplary sequence of drawing commands input to the image processing apparatus according to a second embodiment of the present invention, and exemplary results of executing the drawing commands.

FIGS. 8A to 8D are schematic diagrams showing the exemplary content of graphics drawing results stored by the graphics storage unit when the drawing commands shown in FIG. 7A are executed sequentially.

BEST MODE FOR CARRYING OUT THE INVENTION

Embodiments of the present invention will now be described hereinafter in detail, with reference to the accompanying drawings. It is to be understood that the following embodiments are not intended to limit the claims of the present invention, and that not all combinations of the aspects that are described according to the following embodiments are necessarily required with respect to the means to solve the problems according to the present invention.

Figure 1:
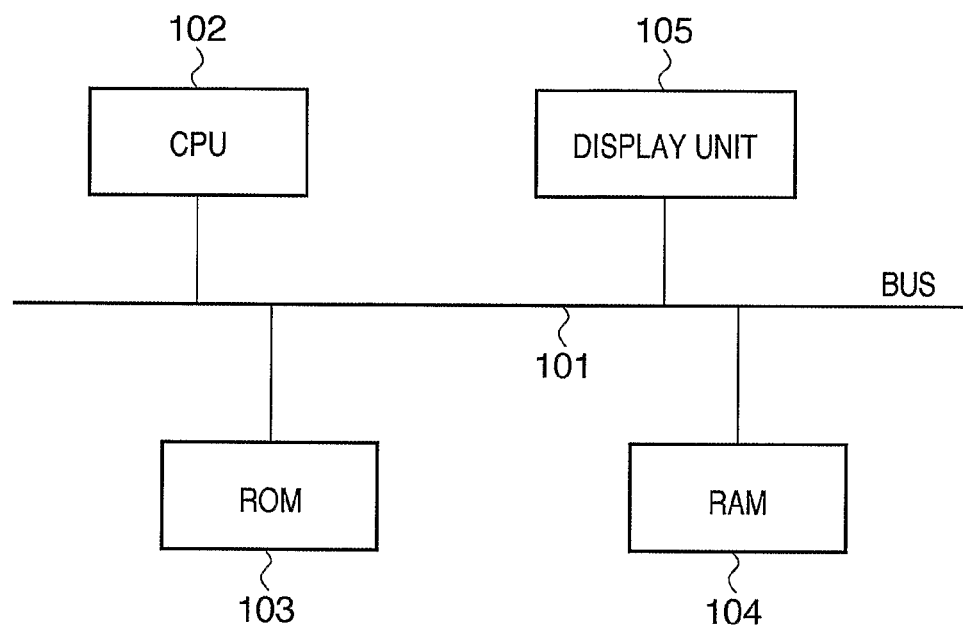
FIG. 1 is a block diagram describing a schematic configuration of an image processing apparatus according to exemplary embodiments of the present invention.

FIG. 1 is a block diagram describing a schematic configuration of an image processing apparatus according to exemplary embodiments of the present invention.

In FIG. 1, a CPU 102 controls operation of the image processing apparatus in accordance with programs loaded in a ROM 103 or a RAM 104. The ROM 103 stores programs and various parameters that do not require modification. The RAM 104 is constituted by a SDRAM, a DRAM or the like, and provides a work area for use by the CPU 102, as well as being used for temporarily storing programs supplied from an external device or the like and various data such as image data. A display unit 105 displays images drawn by programs. A system bus 101 connects the CPU 102, the ROM 103, the RAM 104 and the display unit 105 to one another.

FIG. 2 is a functional block diagram illustrating the functions of an image processing apparatus 201 according to the exemplary embodiments.

In FIG. 2, a drawing controller 202 in the image processing apparatus 201 according to the present embodiment inputs drawing commands including one or more moving image drawing commands and one or more graphics drawing commands, and creates graphics. A graphics storage unit 203 stores the created graphics. A moving image drawing unit 204 creates moving image frames in accordance with input moving image data and instructions from a drawing command separator 206, and outputs created moving image frames to a composition unit 205. The composition unit 205 composes graphics and moving images.

The drawing controller 202 includes the drawing command separator 206, a graphics drawing unit 207, and a clipping unit 208. The drawing command separator 206 receives drawing commands and separates received drawing commands into graphics drawing commands and moving image drawing commands. The graphics drawing unit 207 creates graphics by executing graphics drawing commands separated by the drawing command separator 206, and stores created graphics in the graphics storage unit 203. The clipping unit 208 acquires parameters representing the geometric information of a moving image from moving image drawing commands separated by the drawing command separator 206. The clipping unit 208 then generates a clipping command for graphics drawn by the graphics drawing unit 207, and outputs the generated clipping command to the graphics storage unit 203. The graphics storage unit 203 thereby obtains clipped graphics by performing a clipping process in accordance with the clipping command on graphics stored therein. The moving image drawing unit 204 receives moving image data, acquires the parameters of a two-dimensional affine transformation, for example, for a moving image from moving image drawing commands separated by the drawing command separator 206, and performs a transformation process on the moving image data. The composition unit 205 composes graphics stored in the graphics storage unit 203 and moving image data transformed by the moving image drawing unit 204, and outputs the resultant composition image to the display unit 105 for display.

First Embodiment

Next, the flow of processing in the image processing apparatus according to a first embodiment of the present invention will be described. The geometric information of a moving image according to the first embodiment is represented by the parameters of a two-dimensional affine transformation.

FIG. 3A depicts a view describing exemplary drawing commands input to the image processing apparatus according to the present embodiment.

Figure 3B:
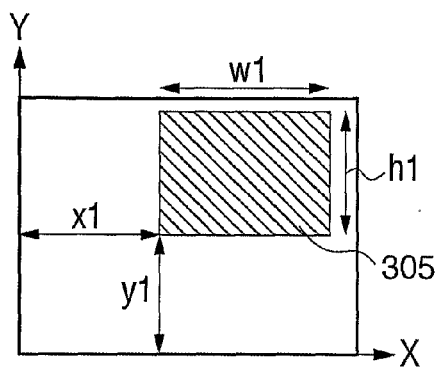

These drawing commands include a rectangle drawing command 301, a moving image drawing command 302, a rectangle drawing command 303 and a moving image drawing command 304, and are called in the order shown in FIG. 3A. The rectangle drawing command 301 is for drawing a rectangle with lower-left corner at $(x1, y1)$, width w1 in the X-axis direction and height h1 in the Y-axis direction with a color c1. This rectangle is shown by a rectangle 305 in FIG. 3B. The rectangle drawing command 303 is similarly for drawing a rectangle with lower-left corner at $(x3, y3)$, width w3 in the X-axis direction and height h3 in the Y-axis direction with a color c3. This rectangle is shown by a rectangle 306 in FIG. 3D.

The moving image drawing command 302 is for scaling the moving image by sx2 in the X-axis direction and sy2 in the Y-axis direction, and translating the moving image by x2 in the X-axis direction and y2 in the Y-axis direction. This rectangle is shown by a rectangle 307 in FIG. 3C. The moving image drawing command 304 is similar for scaling the moving image by sx4 in the X-axis direction and sy4 in the Y-axis direction, and translating the moving image by x4 in the X-axis direction and y4 in the Y-axis direction. This rectangle is shown by a rectangle 308 in FIG. 3E.

Figure 3C:
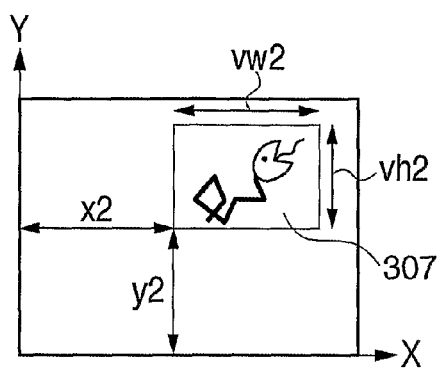
Figure 3D:
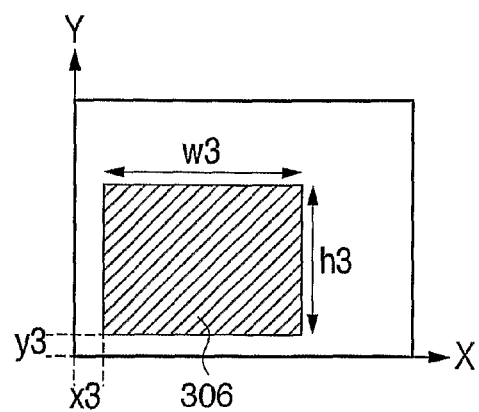
Figure 3E:
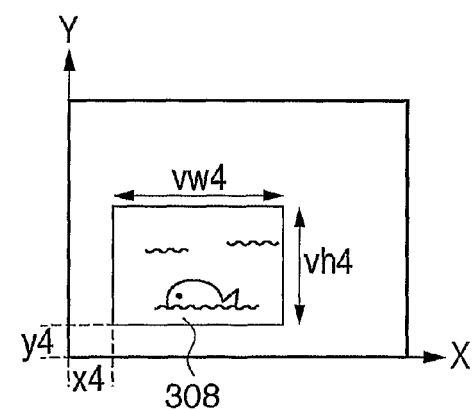

The drawing content in the case where the respective drawing processes are independently executed are shown in FIGS. 3B to 3E. In FIG. 3C, the width vw2 of the image results from scaling the width of the moving image by sx2, and the height vh2 results from scaling the height of the moving image by sy2. Similarly, the width vw4 of the image in FIG. 3E results from scaling the width of the moving image by sx4, and the height vh4 results from scaling the height of the moving image by sy4. Note that while the present embodiment is described using scaling and translation as a two-dimensional affine transformation, rotation, skewing or the like may be used, or an affine transformation that combines these transformations may be used.

The drawing command separator 206 receives drawing commands one at a time, and separates these drawing commands into moving image drawing commands and graphics drawing commands. If the input drawing command is a graphics drawing command, the graphics drawing unit 207 receives the graphics drawing command and creates graphics by executing the graphics drawing command. The graphics thus created are stored in the graphics storage unit 203. On the other hand, if the input drawing command is a moving image drawing command, firstly a clipping command is generated by the clipping unit 208 and stored in the graphics storage unit 203. The graphics storage unit 203 thereby performs a clipping process on graphics stored therein. Here, the clipping command is generated so as to calculate an area that will be occupied by the moving image from the parameters of the moving image drawing command and to eliminate the graphics in the area. The drawing command separator 206 sends the moving image drawing command to the moving image drawing unit 204, after the instruction for the clipping process has been given by the clipping unit 208. The moving image drawing unit 204 receives the moving image drawing command and performs a transformation process on the moving image data. The composition unit 205 composes a plurality of transformed moving images input from the moving image drawing unit 204 starting with the moving image whose drawing command was input first, and then composes graphics input from the graphics storage unit 203 over the composed moving images. The processing after input of drawing commands has been received will be described using the figures, with the drawing commands shown in FIG. 3A as examples. Firstly, the graphics drawing process will be described.

FIGS. 4A to 4D are schematic diagrams describing the content of graphics drawing results stored by the graphics storage unit 203 when the drawing commands shown in FIG. 3A are executed sequentially.

Figures 4A, 4B:
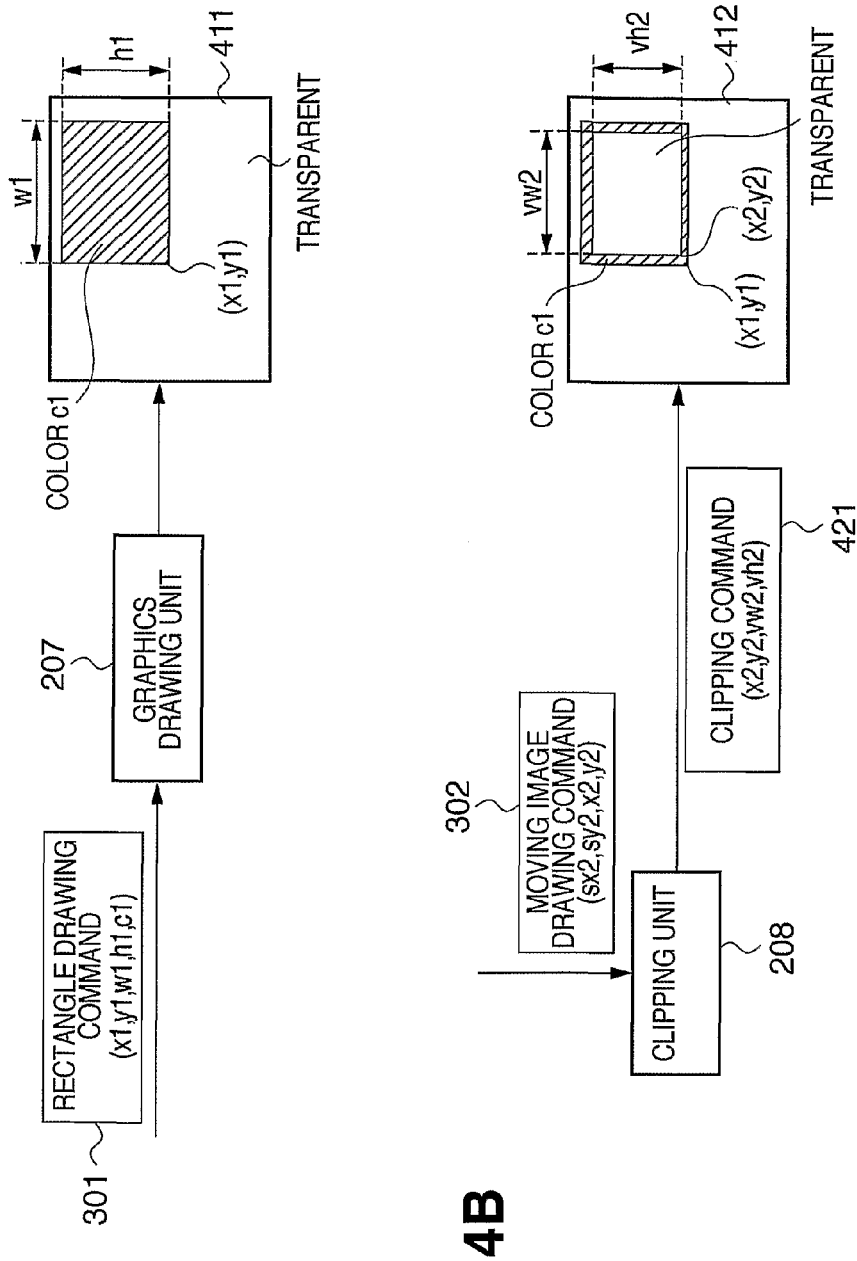

Firstly, the content of graphics drawing results stored by the graphics storage unit 203 is cleared and made transparent. When the rectangle drawing command 301 shown in FIG. 3A is input, this drawing command is determined by the drawing command separator 206 to be a graphics drawing command, and processing is executed by the graphics drawing unit 207. A rectangle is thereby drawn with the color c1, as shown in FIG. 4A. Reference numeral 411 in FIG. 4A denotes this drawing result.

Next, when the moving image drawing command 302 shown in FIG. 3A is input, this drawing command is determined by the drawing command separator 206 to be a moving image drawing command, and a clipping command 421 is generated by the clipping unit 208. The processing in this case is shown in FIG. 4B. This clipping command 421 changes the color values of pixels in the area of the rectangle with lower-left corner at (x2, y2), width vw2 in the X-axis direction and height vh2 in the Y-axis direction to make the pixels transparent. The drawing result when this clipping command 421 is processed will be as shown by reference numeral 412. In FIG. 4B, the rectangular area in FIG. 4A (equivalent to 305 in FIG. 3B) has been clipped with the area shown by 307 in FIG. 3C.

Next, when the rectangle drawing command 303 shown in FIG. 3A is input, processing is executed by the graphics drawing unit 207, and a rectangle is drawn with the color c3 (FIG. 4C). This rectangle is equivalent to 306 in FIG. 3D. A drawing result 413 shown in FIG. 4C is obtained by this processing.

Next, when the moving image drawing command 304 shown in FIG. 3A is input, this drawing command is determined by the drawing command separator 206 to be a moving image drawing command, and a clipping command 422 (FIG. 4D) is generated by the clipping unit 208. This is for clipping the rectangle 306 in FIG. 3D with the rectangle 308 in FIG. 3E. The clipping command 422 clips the area of the rectangle with lower-left corner (x4, y4), width vw4 in the X-axis direction and height vh4 in the Y-axis direction, and a drawing result 414 shown in FIG. 4D is obtained by this clipping process.

Next, the moving image drawing process will be described using the schematic diagram of FIG. 5.

Figure 5:
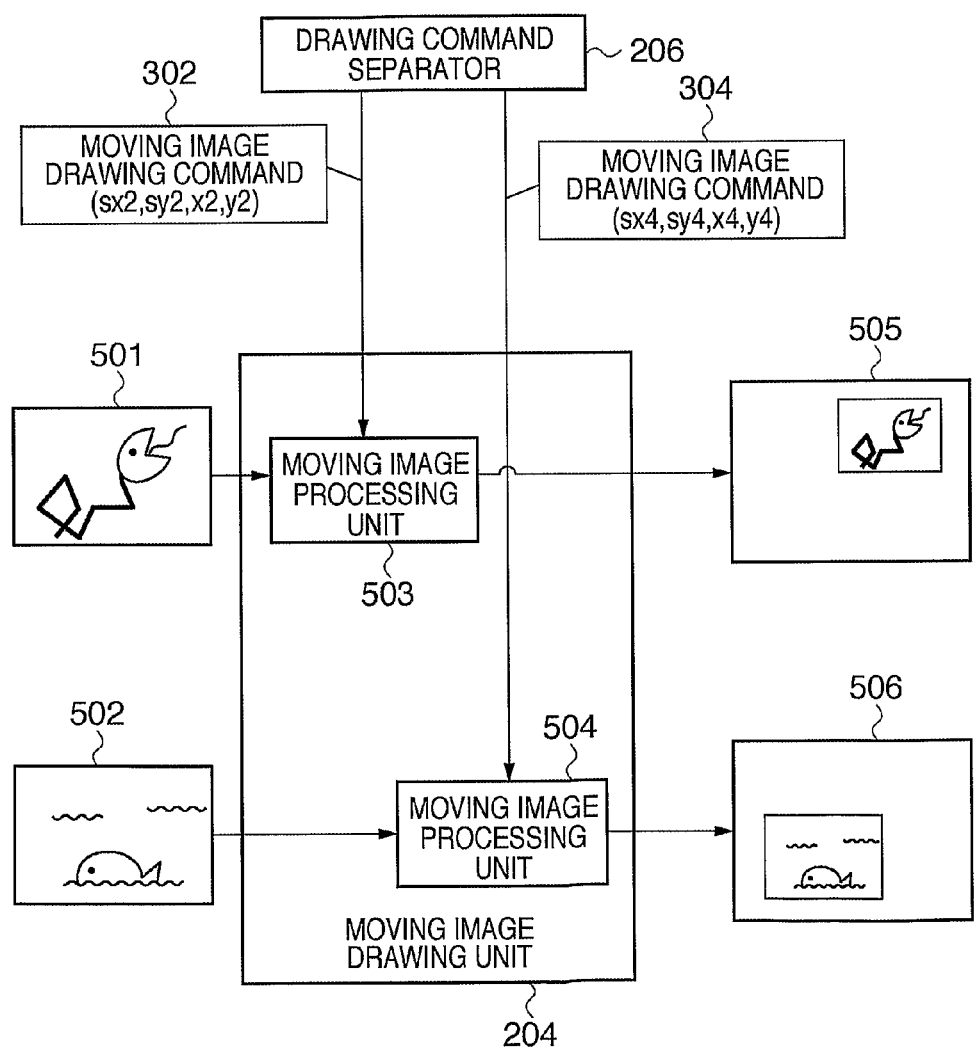
FIG. 5 is a schematic diagram illustrating a moving image drawing process according to the first embodiment.

FIG. 5 is a schematic diagram describing the moving image drawing process according to the first embodiment of the present invention.

The moving image drawing unit 204 has a plurality of moving image processing units (503, 504), and these moving image processing units correspond one-to-one with the moving image drawing commands. Here, moving image data drawn using the moving image drawing command 302 is given as moving image data 501, and moving image data drawn using the moving image drawing command 304 is given as moving image data 502. A moving image processing unit 503 processes the moving image drawing command 302, and a moving image processing unit 504 processes the moving image drawing command 304. The moving image processing units 503 and 504 respectively receive the moving image data 501 and 502. Note that here the format of moving image data may be any of MPEG-1, MPEG-2, AVI or the like, and is not specified here. Further, the moving image processing units 503 and 504 respectively perform a transformation process on this moving image data in accordance with the moving image drawing commands supplied from the drawing command separator 206. For example, the moving image processing unit 503 scales the moving image data 501 by sx2 in the X-axis direction and sy2 in the Y-axis direction, and translates the moving image data 501 by x2 in the X-axis direction and y2 in the Y-axis direction, based on the parameters in the moving image drawing command 302, as a result of which transformed moving image data 505 is obtained. The moving image processing unit 504 similarly scales the moving image data 502 by sx4 in the X-axis direction and sy4 in the Y-axis direction, and translates the moving image data 502 by x4 in the X-axis direction and y4 in the Y-axis direction, based on the parameters in the moving image drawing command 304, as a result of which transformed moving image data 506 is obtained. These processes are the same as those illustrated with the foregoing FIGS. 3C and 3E.

Figure 6:
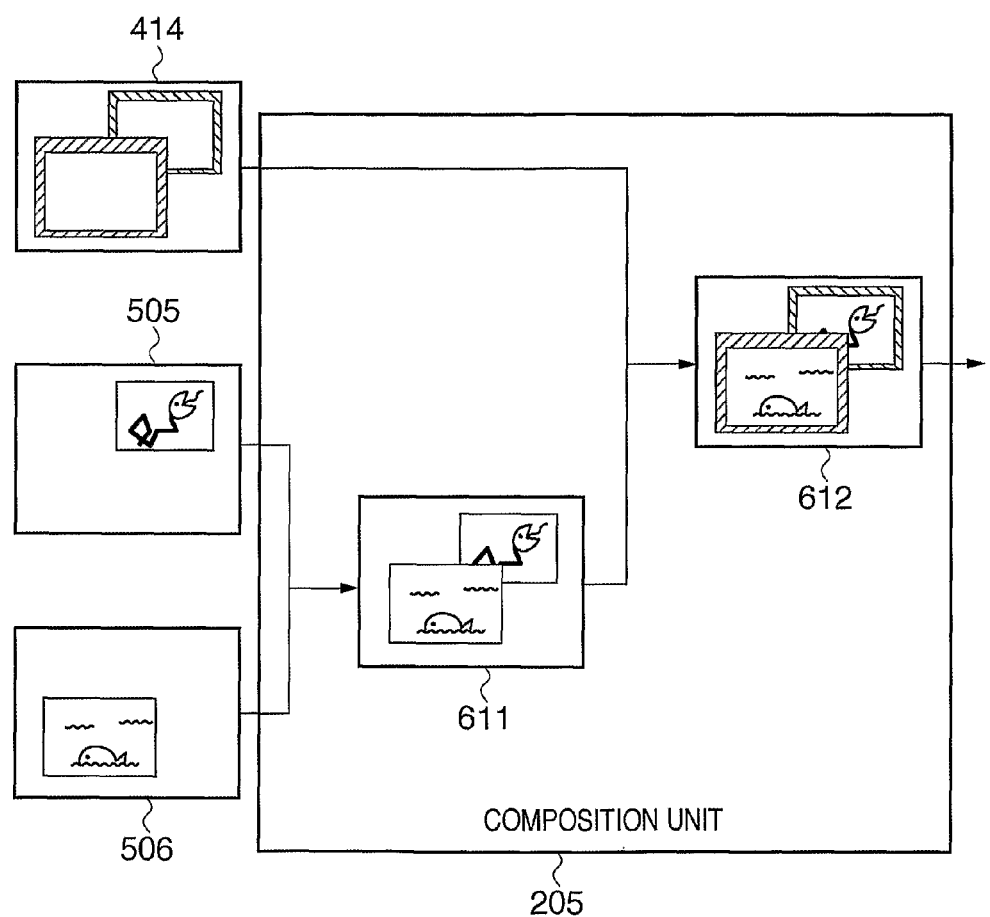
FIG. 6 is a schematic diagram illustrating a composition process in a composition unit according to the first embodiment.

FIG. 6 is a schematic diagram describing the composition process in the composition unit 205 according to the present embodiment.

The drawing result 414 from the graphics storage unit 203 and the transformed moving image data 505 and 506 are input to the composition unit 205. The composition unit 205 firstly inputs the transformed moving image data 505 and 506, and composes these moving image data. The transformed moving image data 505 and 506 are respectively generated using the moving image drawing command 302 and the moving image drawing command 304. Because the moving image drawing command 302 is input to the drawing controller 202 before the moving image drawing command 304, the composition process is performed by layering the transformed moving image data 505 and 506 such that the moving image data 505 is positioned under the moving image data 506. A composition result with the moving image data 506 placed over the moving image data 505 is obtained as a result, as shown by 611 in FIG. 6. Next, the drawing result 414 stored in the graphics storage unit 203 and the moving image composition result 611 are composed. This time the composition process is performed by layering the moving image composition result 611 and the drawing result 414 such that the moving image composition result 611 is under the drawing result 414. A composition result 612 from composing moving images and graphics is thus ultimately obtained, and this composition result is displayed on the display unit 105.

Note that while the first embodiment was described in terms of two moving image drawing commands being included in the drawing commands, the present invention is realized even in the case of there being one moving image drawing command or three or more moving image drawing commands. Also, while the composition process is here performed starting with the moving image, the composition process may be performed in any order provided that the hierarchical relation of the layers is maintained.

Second Embodiment

Hereinafter, a second embodiment of the present invention will be described with reference to the figures. Note that because the hardware configuration and the functional configuration of the image processing apparatus according to the second embodiment are the same as that described for the foregoing first embodiment, description thereof will be omitted.

Next, the flow of processing in the image processing apparatus according to the second embodiment of the present invention will be described. Here, the geometric information of a moving image used in the second embodiment is represented by a mask image (mask information) as well as by specification of the parameters of a two-dimensional affine transformation.

FIG. 7A shows an exemplary sequence of drawing commands input to the image processing apparatus according to the second embodiment.

These drawing commands include a polygonal drawing command 701, a moving image drawing command 702, an elliptic drawing command 703 and a moving image drawing command 704, and are called in the respective order in which they are input. Next, the drawing results from the respective drawing commands will be described using the schematic diagram shown in FIG. 7B.

Figure 7B:
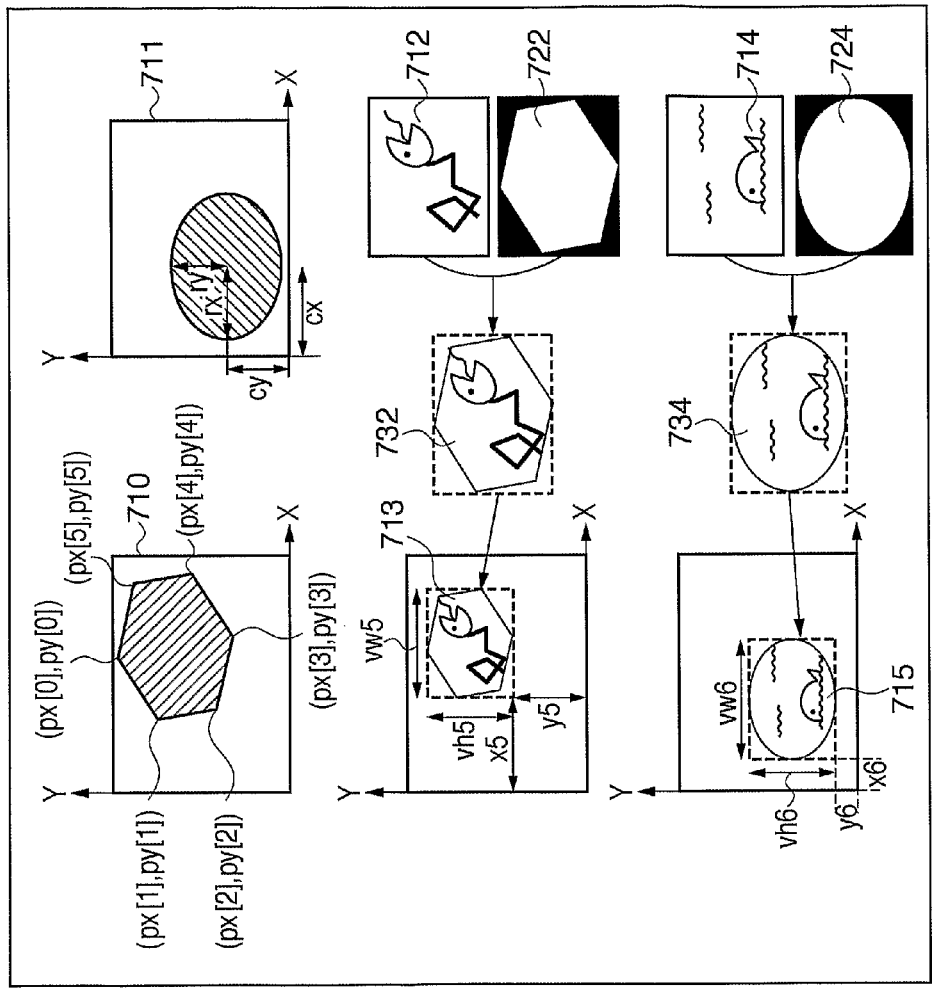

The polygonal drawing command 701 is a graphics drawing command in which six X coordinates and Y coordinates are here transferred as an array px[ ], py[ ]. For example, in the case of a hexagon, line segments are drawn in the order (px[0], py[0]), (px[1], PY[1]), (Px[2], PY[2]), (Px[3], PY[3]), (Px[4], PY[4]), (px[5], py[5]) and (px[0], py[0]). The area enclosed by these line segments is then filled in with a color cp. Reference numeral 710 in FIG. 7B shows an exemplary polygon drawn using this polygonal drawing command 701.

The elliptic drawing command 703 is a graphics drawing command for filling in an ellipsoid with central coordinates (cx, cy), width $2rx$ and height $2ry$, that is, the pixels of coordinates (x, y) satisfying an equation represented by the following expression (1) with a color ce. Reference numeral 711 in FIG. 7B shows an exemplary ellipsoid drawn using this elliptic drawing command 703.

$$(x-cx)^2/rx^2 + (y-cy)^2/ry^2 \leq 1 \quad (1)$$

The moving image drawing command 702 performs a masking process on moving image data using mask image data m5, scales the masked moving image by sx5 in the X-axis direction and sy5 in the Y-axis direction, and translates the masked moving image by x5 in the X-axis direction and y5 in the Y-axis direction. Mask image data m5 is provided with a "0" or "1" mask value for each pixel of input moving image data 712, and the moving image data 712 is transformed such that pixels whose mask value is "0" will be transparent and pixels whose mask value is "1" will be the color of the pixels in the moving image data.

A mask image 722 illustrates the mask image data m5. The mask values of the black area are "0" and the mask values of the white area are "1". Masked moving image data 732 is generated by processing the moving image data 712 using this mask image 722. Moving image data such as shown by 713 in FIG. 7B is obtained using the moving image drawing command 702. Here, the width vw5 of the moving image results from scaling the width of the moving image 712 by sx5, and the height vh5 results from scaling the height of the moving image 712 by sy5.

The moving image drawing command 704 similarly performs a masking process on moving image data using mask image data m6, scales the masked moving image by sx6 in the X-axis direction and sy6 in the Y-axis direction, and translates the masked moving image by x6 in the X-axis direction and y6 in the Y-axis direction. A mask image 724 illustrates the mask image data m6, and masked moving image data 734 is generated by performing the masking process on moving image data 714. Moving image data such as shown by 715 in FIG. 7B is obtained using the moving image drawing command 704. Here, the width vw6 of the moving image results from scaling the width of the moving image data 714 by sx6, and the height vh6 results from scaling the height of the moving image data 714 by sy6.

Next, the processing after drawing commands such as shown in FIG. 7A are received in the second embodiment will be described using the examples shown in FIGS. 7A and 7B. Firstly, the graphics drawing process will be described.

FIGS. 8A to 8D are schematic diagrams describing the exemplary content of graphics drawing results stored by the graphics storage unit 203 when the drawing commands shown in FIG. 7A are executed sequentially.

Firstly, the content of graphics drawing results stored by the graphics storage unit 203 is cleared and all of the pixels are made transparent.

When the polygonal drawing command 701 in FIG. 7A is input, this drawing command is determined by the drawing command separator 206 to be a graphics drawing command, and a polygon is drawn with a color cp as a result of a drawing process being executed by the graphics drawing unit 207, as shown in FIG. 8A. The drawing result stored by the graphics storage unit 203 will be as shown by a drawing result 911.

Next, when the moving image drawing command 702 in FIG. 7A is input, this drawing command is determined by the drawing command separator 206 to be a moving image drawing command. New mask image data m15 obtained by scaling the mask image data m5 by sx5 in the X-axis direction and sy5 in the Y-axis direction and translating the mask image data m5 by x5 in the X-axis direction and y5 in the Y-axis direction is then generated by the clipping unit 208. As shown in FIG. 8B, a clipping command 921 is then generated with this generated mask image data m15 as a parameter. This clipping command 921 is for converting the graphics drawing result 911 to make pixels whose mask value in the mask image data m15 is "1" transparent. A drawing result 912 shown in FIG. 8B is then obtained by executing this clipping command 921.

Figure 8C:
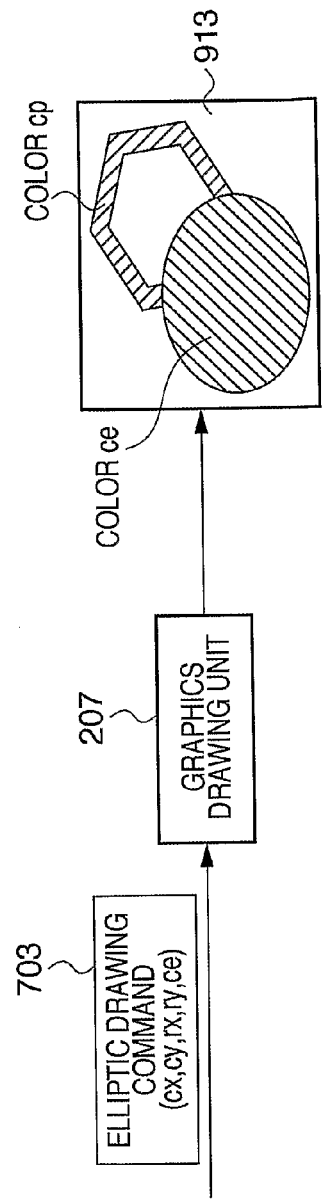

When the ellipsoid drawing command 703 in FIG. 7A is input, an ellipsoid is drawn with a color ce as a result of a drawing process being executed by the graphics drawing unit 207 to obtain a drawing result 913, as shown in FIG. 8C.

Figure 8D:
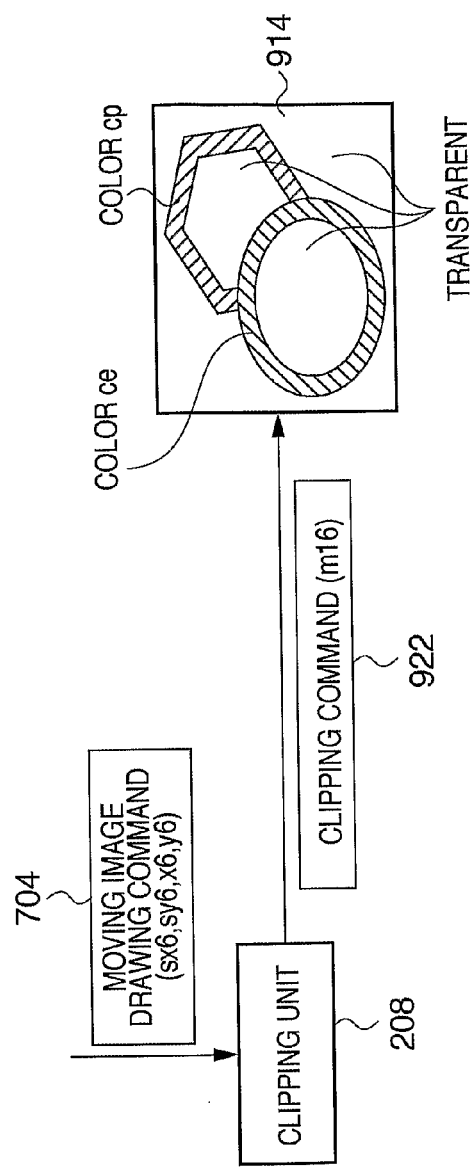

Next, when the moving image drawing command 704 in FIG. 7A is input, this drawing command is determined by the drawing command separator 206 to be a moving image drawing command. New mask image data m16 obtained by scaling the mask image data m6 by sx6 in the X-axis direction and sy6 in the Y-axis direction and translating the mask image data m6 by x6 in the X-axis direction and y6 in the Y-axis direction is then generated by the clipping unit 208. As shown in FIG. 8D, a clipping command 922 is then generated with this generated mask image data m16 as a parameter and processed. This clipping command 922 is for converting the graphics drawing result to make pixels whose mask value in the mask image data m16 is "1" transparent. A drawing result 914 is then obtained by executing this clipping command 922.

Figure 9:
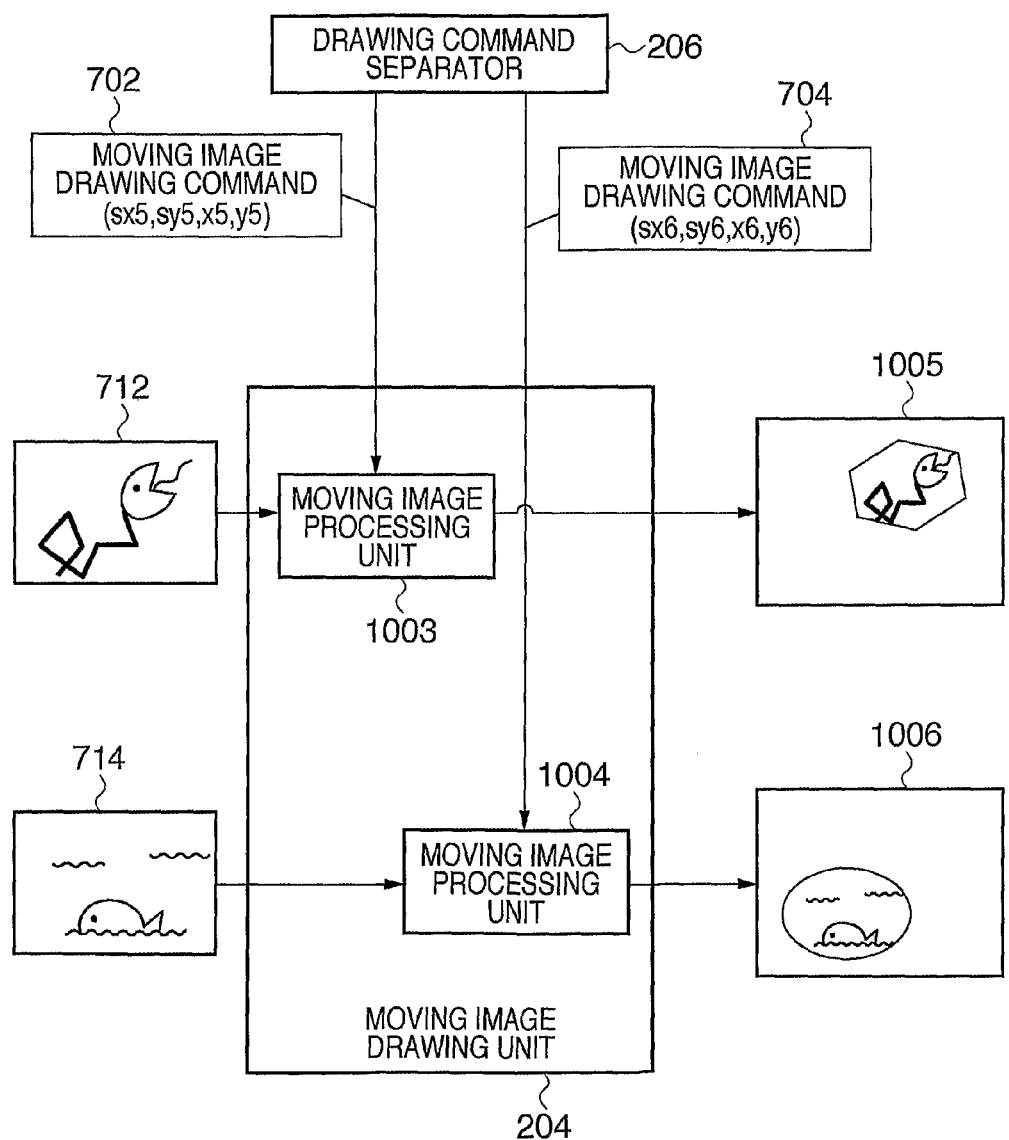
FIG. 9 depicts a view describing a moving image drawing process in a moving image drawing unit according to the second embodiment.

FIG. 9 illustrates the moving image drawing process in the moving image drawing unit 204 according to the second embodiment.

The moving image drawing unit 204 has a plurality of moving image processing units (1003, 1004), and these moving image processing units correspond one-to-one with the moving image drawing commands. Moving image data processed by a moving image processing unit 1003 in accordance with the moving image drawing command 702 shown in the foregoing FIG. 7A is given as moving image data 712, and moving image data processed by a moving image processing unit 1004 in accordance with the moving image drawing command 704 is given as moving image data 714. The moving image processing units 1003 and 1004 respectively receive the moving image data 712 and 714. The format of the moving image data at this time may be any of MPEG-1, MPEG-2, AVI or the like, and is not specified here. Further, the drawing command separator 206 receives moving image drawing commands, and the moving image processing units 1003 and 1004 perform a masking process and a transformation process on the respective moving image data in accordance with the moving image drawing commands. The moving image processing unit 1003 firstly transforms the moving image data 712 using the mask image data m5, based on the parameters in the moving image drawing command 702. Further, the moving image processing unit 1003 then scales the moving image data by sx5 in the X-axis direction and sy5 in the Y-axis direction and translates the moving image data by x5 in the X-axis direction and y5 in the Y-axis direction, and outputs processed moving image data 1005. Similarly, the moving image processing unit 1004 transforms the moving image data using the mask image data m6, based on the parameters in the moving image drawing command 704. Further, the moving image processing unit 1004 scales the moving image data by sx6 in the X-axis direction and sy6 in the Y-axis direction and translates the moving image data by x6 in the X-axis direction and y6 in the Y-axis direction, and outputs processed moving image data 1006.

Figure 10:
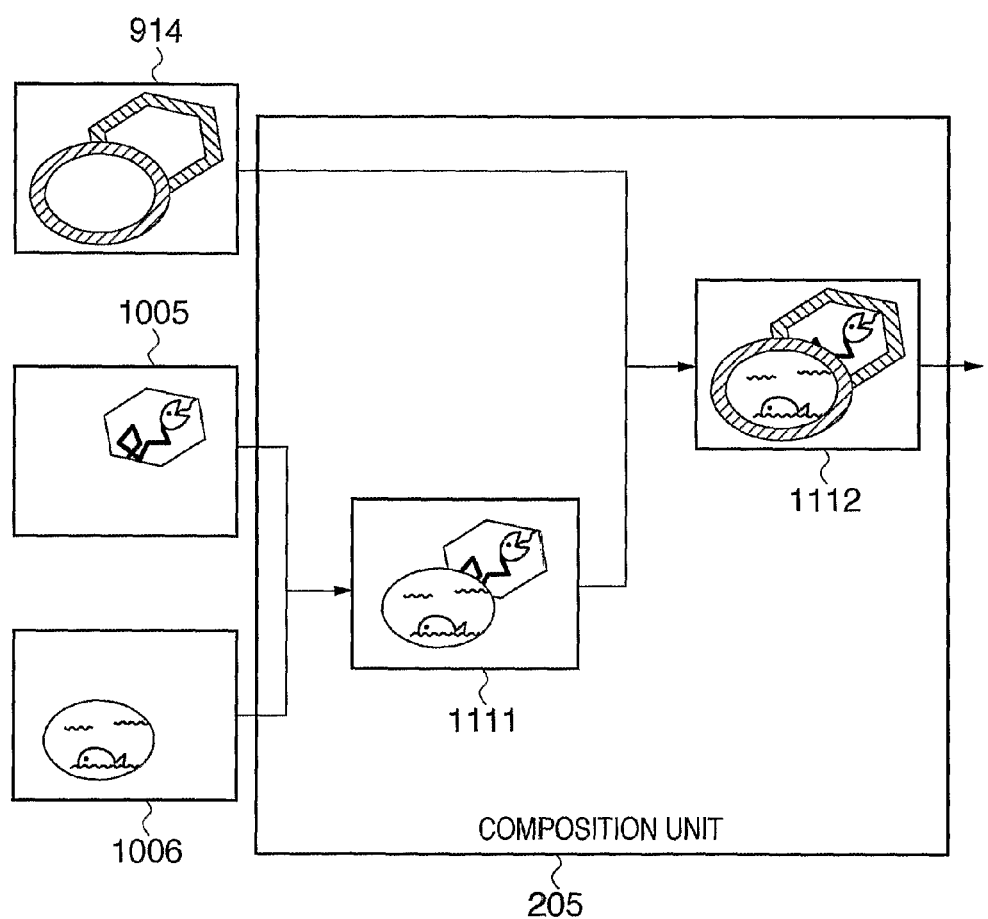
FIG. 10 is a schematic diagram illustrating a composition process in a composition unit according to the second embodiment.

FIG. 10 is a schematic diagram describing the composition process in the composition unit 205 according to the second embodiment.

Here, the drawing result 914 shown in FIG. 8D and the processed moving image data 1005 and 1006 shown in FIG. 9 are input to the composition unit 205. The composition unit 205 firstly composes the processed moving image data 1005 and the processed moving image data 1006. As illustrated with FIG. 9, the processed moving image data 1005 is generated using the moving image drawing command 702, and the processed moving image data 1006 is generated using the moving image drawing command 704. Here, because the moving image drawing command 702 is input to the drawing controller 202 before the moving image drawing command 704, the composition process is performed by layering the processed moving image data 1005 and 1006 such that the moving image data 1005 is under the moving image data 1006. A moving image composition result 1111 is obtained as a result.

Next, the drawing result 914 stored in the graphics storage unit 203 and the moving image composition result 1111 are composed. This time the composition process is performed by layering the moving image composition result 1111 and the drawing result 914 such that the moving image composition result 1111 is under the drawing result 914. A composition result 1112 from composing moving images and graphics is thus ultimately obtained, and this composition result is displayed on the display unit 105.

Other Embodiments

While the embodiments of the present invention have been detailed above, the present invention may be applied to a system constituted by a plurality of devices or to an apparatus composed of a single device.

Note that the present invention can be achieved by a software program for realizing the functions of the foregoing embodiments being directly or remotely supplied to a system or an apparatus, and a computer in the system or apparatus reading out and executing the supplied program. In this case, as long as the functions of the program are provided, this embodiment need not be in the form of a program.

Consequently, the present invention is also realized by the actual program code installed on a computer, in order to realize the functions and processes of the present invention by computer. In other words, the claims of the present invention also encompass the actual computer program for realizing the functions and processes of the present invention. In this case, as long as the functions of the program are provided, the program may take any form, such as an object code, a program executed by an interpreter, script data supplied to an operating system, or the like.

The functions of the foregoing embodiments can be realized in forms other than by a computer executing the read program. For example, an operating system or the like running on a computer can perform part or all of the actual processing based on instructions in the program, and the functions of the foregoing embodiments can be realized by this processing.

While the present invention has been described with reference to embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-154589, filed Jun. 12, 2008, which is hereby incorporated by reference herein in its entirety.

The invention claimed is:

1. An image processing apparatus comprising:
a processor; and
a memory coupled to the processor to store instructions that, when executed by the processor, cause the processor to perform operations comprising:
an acquiring step configured to acquire (i) a moving image drawing command for displaying a moving image including information related to coordinates and display size of the moving image and to acquire (ii) a graphics drawing command for displaying graphics and including information related to coordinates, display size, and color of the graphics;
a graphics generating step configured to generate graphics data according to the information related to display size and color of the graphics included in the graphics drawing command acquired by the acquiring step;
a storage step configured to store graphics data generated by the graphics generating step into the memory;
a determining step configured to determine, based on the information related to coordinates and display size of the graphics included in the graphics drawing command and the information related to coordinates and display size of the moving image included in the moving image drawing command, an overlap display area in which a moving image display area for displaying the moving image according to the moving image drawing command and a graphics display area for displaying the graphics data according to the graphics drawing command are overlapped;
a generating step configured to generate a clipping command for setting transparent data to the overlap display area and including information related to coordinates and display size of the overlap display area;
a changing step configured to change the graphics data, stored in the storage unit, corresponding to the overlap display area within the graphics display area according to the graphics drawing command into transparent data according to the information related to coordinates and display size of the overlap display area included in the generated clipping command; and a composition step configured to generate combined image data by combining the changed graphics data changed by the changing step and stored in the storage step with the moving image according to the moving image drawing command, wherein, in a case where the acquiring step acquires a first graphics drawing command for displaying first graphics, a first moving image drawing command for displaying a first moving image, a second graphics drawing command for displaying second graphics, and a second moving image drawing command for displaying a second moving image, the determining step determines:

(i) a first overlap display area in which a first moving image display area for displaying the first moving image according to the first moving image drawing command and a first graphics image display area for displaying the first graphics according to the first graphics drawing command are overlapped, and (ii) a second overlap display area in which a second moving image display area for displaying the second moving image according to the second moving image drawing command and a second graphics display area for displaying the second graphics according to the second graphics drawing command are overlapped, wherein the generating step generates a first clipping command for setting transparent data to the first overlap display area and generates a second clipping command for setting transparent data to the second overlap display area.

2. The image processing apparatus according to claim 1, wherein geometric information is included in moving image drawing commands, and further comprising:

a receiving step configured to receive moving image data according to the moving image drawing commands; and a moving image generating step configured to output processed moving image data obtained by at least one of scaling processing and rotate processing on the received moving image data in accordance with the geometric information, wherein the composition step generates the combined image data by combining the changed graphics data stored in the storage step with the processed moving image data.

3. The image processing apparatus according to claim 2, wherein the geometric information is a parameter of an affine transformation.

4. The image processing apparatus according to claim 2, wherein the geometric information is mask information for a moving image.

5. The apparatus according to claim 1, wherein the changing step changes:

(i) graphics data corresponding to the first overlap display area into the transparent data, according to the first clipping command, and (ii) graphics data corresponding to the second overlap display area into the transparent data, according to the second clipping command, and wherein the composition step generates combined graphics data by combining the first graphics according to the first graphics drawing command, the transparent data according to the first clipping command, the second graphics according to the second graphics drawing command, and the transparent data according to the second clipping command, and wherein the composition step generates the combined image data by combining the combined graphics data with the first and second moving image data such that the combined graphics data is displayed in front of the first and second moving images.

6. The apparatus according to claim 1, further comprising a size changing step configured to change the size of the moving image according to the moving image drawing command by using the information related to the display size of the moving image, wherein the composition step generate the combined image data by combining the changed graphics data and the changed moving image data which is changed by the size changing step.

7. The apparatus according to claim 1, wherein mask information is included in the moving image drawing commands acquired by the acquiring step, the mask information indicating an area not to be displayed the moving image according to moving image drawing commands, and wherein the determining step determines the overlap display area based on the mask information.

8. A method of controlling an image processing apparatus, the method comprising:

an acquiring step of acquiring (i) a moving image drawing command for displaying a moving image and including information related to coordinates and display size of the moving image and acquiring (ii) a graphics drawing command for displaying graphics and including information related to coordinates, display size, and color of the graphics;

a graphics generating step of generating graphics data according to the information related to display size and color of the graphics included in the graphics drawing command acquired in the acquiring step;

a storage step of storing graphics data generated in the graphics generating step into a memory;

a determining step of determining, based on the information related to coordinates and display size of the graphics included in the graphics drawing command and the information related to coordinates and display size of the moving image included in the moving image drawing command, an overlap display area in which a moving image display area for displaying the moving image according to the moving image drawing command and a graphics display area for displaying the graphics data according to the graphics drawing command are overlapped;

a generating step of generating a clipping command for setting transparent data to the overlap display area and including information related to coordinates and display size of the overlap display area;

a changing step of changing graphics data, stored in the memory, corresponding to the overlap display area within the graphics display area according to the graphics drawing command into transparent data according to the information related to coordinates and display size of the overlap display area included in the generated clipping command; and a composition step of generating combined image data by combining the changed graphics data changed in the changing step and stored in the memory with the moving image according to the moving image drawing command, wherein, in a case where the acquiring step acquires a first graphics drawing command for displaying first graphics, a first moving image drawing command for displaying a first moving image, a second graphics drawing command for displaying second graphics, and a second moving image drawing command for displaying a second moving image, the determining step determines:
- (i) a first overlap display area in which a first moving image display area for displaying the first moving image according to the first moving image drawing command and a first graphics image display area for displaying the first graphics according to the first graphics drawing command are overlapped, and
- (ii) a second overlap display area in which a second moving image display area for displaying the second moving image according to the second moving image drawing command and a second graphics display area for displaying the second graphics according to the second graphics drawing command are overlapped, wherein the generating step generates a first clipping command for setting transparent data to the first overlap display area and generates a second clipping command for setting transparent data to the second overlap display area.

9. The control method according to claim 8, wherein geometric information included in moving image drawing commands, and further comprising:
- a receiving step of receiving moving image data according to the moving image drawing commands; and
- a moving image generating step of outputting processed moving image data obtained by at least one of scaling processing and rotate processing on the received moving image data in accordance with the geometric information, and
- wherein the composition step generates the combined image data by combining the changed graphics data and the processed moving image data.

10. The control method according to claim 9, wherein the geometric information is a parameter of an affine transformation.

11. The control method according to claim 9, wherein the geometric information is mask information for a moving image.

12. The method according to claim 8, wherein the changing step changes:
- (i) graphics data corresponding to the first overlap display area into the transparent data, according to the first clipping command, and
- (ii) graphics data corresponding to the second overlap display area into the transparent data, according to the second clipping command, and wherein the composition step generates combined graphics data by combining the first graphics according to the first graphics drawing command, the transparent data according to the first clipping command, the second graphics according to the second graphics drawing command, and the transparent data according to the second clipping command, and the composition step generates the combined image data by combining the combined graphics data with the first and second moving image data such that the combined graphics data is displayed in front of the first and second moving images.

13. The method according to claim 8, further comprising a size changing step configured to change the size of the moving image according to the moving image drawing commands using the information related to the display size of the moving image,
- wherein the composition step generates the combined image data by combining the changed graphics data and the changed moving image data which is changed in the size changing step.

14. The method according to claim 8, wherein mask information is included in the moving image drawing commands acquired in the acquiring step, the mask information indicating an area not to be displayed the moving image according to the moving image drawing command, and
- wherein the determining step determines the overlap display area based on the mask information.

* * * * *